(12) United States Patent
Trantham et al.

(10) Patent No.: US 11,989,428 B2
(45) Date of Patent: May 21, 2024

(54) RADIATION-RESISTANT DATA STORAGE DEVICE

(71) Applicant: Seagate Technology LLC, Fremont, CA (US)

(72) Inventors: Jon D. Trantham, Chanhassen, MN (US); Hemant Vitthalrao Mane, Pune (IN); Kristofer Carlson Conklin, Minneapolis, MN (US); Manuel Alexander Offenberg, South Lake Tahoe, CA (US); Steven Williams, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 32 days.

(21) Appl. No.: 17/869,238

(22) Filed: Jul. 20, 2022

(65) Prior Publication Data

US 2023/0350588 A1 Nov. 2, 2023

(30) Foreign Application Priority Data

Apr. 29, 2022 (IN) .............................. 202221025342

(51) Int. Cl.
*G06F 3/06* (2006.01)
(52) U.S. Cl.
CPC .......... *G06F 3/0626* (2013.01); *G06F 3/0655* (2013.01); *G06F 3/0689* (2013.01)

(58) Field of Classification Search
CPC ..... G06F 3/0626; G06F 3/0655; G06F 3/0689
See application file for complete search history.

(56) References Cited

U.S. PATENT DOCUMENTS

| | | | | |
|---|---|---|---|---|
| 6,104,211 A | * | 8/2000 | Alfke | G06F 11/183 326/14 |
| 6,324,102 B1 | * | 11/2001 | McCollum | G11C 5/005 365/185.29 |
| 7,589,558 B1 | * | 9/2009 | Tseng | G06F 30/34 326/41 |
| 10,466,937 B2 | | 11/2019 | Berger | |
| 10,521,295 B2 | | 12/2019 | Merl | |
| 2018/0241503 A1 | * | 8/2018 | Harper | H04L 1/0058 |
| 2022/0171694 A1 | * | 6/2022 | Haldeman | G06F 9/4405 |

* cited by examiner

*Primary Examiner* — Jason W Blust
(74) *Attorney, Agent, or Firm* — Mueting Raasch Group

(57) ABSTRACT

A data storage system for use in a high radiation environment includes an array of storage drives. Each storage drive includes a non-radiation-hardened drive controller, a non-radiation-hardened, non-volatile, storage medium, and a non-radiation-hardened volatile memory. The system includes a radiation-hardened storage controller coupled to the array. The radiation-hardened storage controller provides failure-resistant data redundancy among the storage drives of the array and provides host access to the array.

21 Claims, 4 Drawing Sheets

RADIATION-RESISTANT DATA STORAGE DEVICE

RELATED PATENT DOCUMENTS

This application claims priority to Indian Provisional Application No. 202221025342, filed on Apr. 29, 2022, which is incorporated herein by reference in its entirety.

SUMMARY

The present disclosure is directed to a radiation-resistant storage device. In one embodiment, a data storage system for use in a high radiation environment includes an array of storage drives. Each storage drive includes a non-radiation-hardened drive controller, a non-radiation-hardened, non-volatile, storage medium, and a non-radiation-hardened volatile memory. The system includes a radiation-hardened storage controller coupled to the array. The radiation-hardened storage controller provides failure-resistant data redundancy among the storage drives of the array and provides host access to the array.

In another embodiment, a data storage system for use in a high radiation environment includes a storage array board coupled to a controller board. The controller board includes a radiation-hardened storage controller. The storage array board includes an array of storage drives. Each of the storage drives includes: a non-radiation-hardened drive controller; a non-radiation-hardened, NAND flash media coupled to the controller; and a non-radiation-hardened volatile memory coupled to the controller. The radiation-hardened storage controller provides failure-resistant data redundancy among the storage drives of the array and further provide host access to the array.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
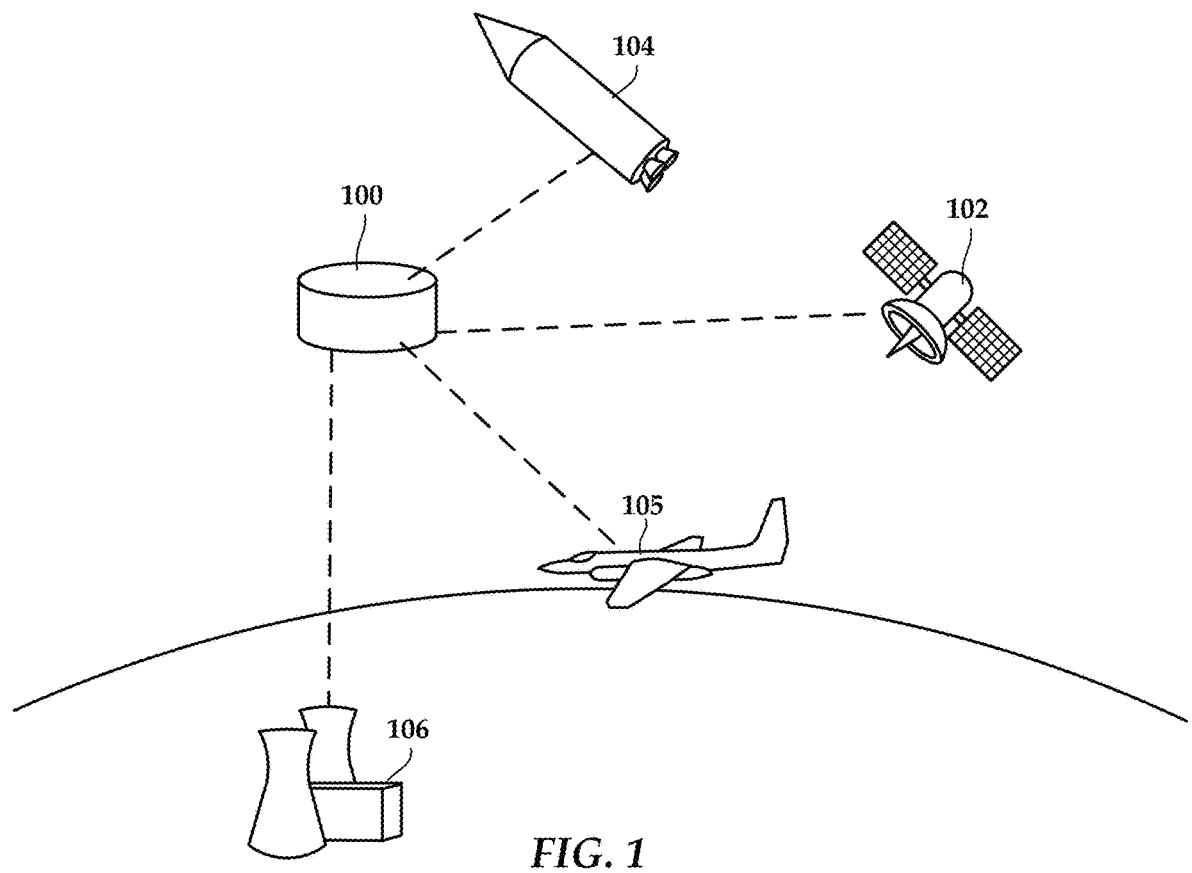
FIG. 1 is a diagram showing applications for a radiation-hardened storage device according to an example embodiment.

This disclosure relates to the design of a data storage system using high-capacity high-performance (e.g., NAND flash) off-the-shelf commercial data storage components that is also reliable under conditions of increased radiation. In FIG. 1, a diagram shows an example of environments in which such a data storage system 100 may be employed. For example, a significant increase in cosmic radiation is well known to occur during space flight, such as in Low-Earth-Orbit (LEO) spacecraft 102. There has recently been a proliferation of LEO satellites, thanks largely to a variety of new commercial rockets with innovative satellite delivery techniques. The desire for high-capacity data storage in LEO satellites has led to using commercial (terrestrial) products in these applications. Unfortunately, these products were not designed with the extreme radiation and temperature environments of LEO in mind and suffer from lack of reliability in this application.

Other types of aerospace vehicles may also benefit from a radiation resistant mass storage device, such as deep space craft 104, high altitude aircraft 105, etc. Also, while aerospace craft are described as a beneficiary of this technology, the storage systems may be used in any high-radiation environment, such as terrestrial nuclear power plants 106, nuclear waste facilities, nuclear cleanup sites, nuclear test sites, etc. Robust "space-grade" data storage products, designed for safety-critical applications are available, however these products are very expensive and often lack the performance and storage capacity of their commercial counterparts.

There are challenges with radiation hardening (RAD hardening) a commercial solid-state drive (SSD) for space or other high radiation environments. Commercial SSDs often use low-density parity codes (LDPC) for error recovery and have complex mapping tables and garbage collection. These lead to controllers with millions of gates and require modern photolithography (e.g., well below 20 nanometers) for suitable performance and power consumption. Putting these controllers in a RAD-hardened Application Specific Integrated Circuit (ASIC) or Field-Programmable Gate Array (FPGA) is generally infeasible or very expensive. Most rad-tolerant FPGAs are in older processes and are challenged for performance and gates. Rad-hard ASICs can cost millions of dollars to develop, and with NAND flash chips changing every year or two, can quickly become obsolete.

The flash used within SSDs poses an additional challenge. Flash chips are designed for high-volume consumer and enterprise applications here on Earth. Flash vendors spend billions of dollars in developing factories (fabs) specifically for these components. The designs of these chips change frequently as new innovations arise. Designing a flash chip specifically for space could cost tens or hundreds of millions of dollars in development. The inventors are unaware of any modern NAND chips designed specifically for space applications.

The solution described herein is a new aerospace data storage device, designed with features making it more robust for LEO and similar environments. In one or more embodiments, rad-tolerant/rad-hard components are used selectively (e.g., where critical and/or inexpensive) and error detection and mitigation techniques are used for radiation-induced events, such as on expensive/unavoidable soft components, to minimize their impact.

Figure 2:
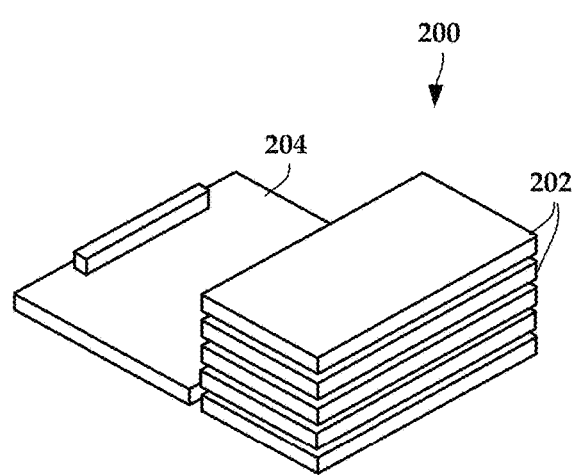
FIG. 2 is a diagram of a radiation-hardened storage according to an example embodiment.

In FIG. 2, a diagram illustrates an example of a data storage system 200 for use in a high radiation environment according to an example embodiment. The system includes an array of drives 202 each comprising non-radiation-hardened controllers and non-radiation-hardened, non-volatile, solid-state storage media. The storage media may include NAND flash memory, resistive random access memory (RRAM), magnetoresistive random access memory (MRAM), phase change memory (PCM), ferroelectric RAM (FeRAM), magnetic disks, etc. Note that the drives 202 are shown here as physically separate units, however some or all of the drives 202 may all be integrated into a single circuit board in some embodiments.

Generally, the drives 202 include circuitry that enables addressing the storage units of the media (e.g., pages, sectors) for purposes of reading and writing, and may include other circuits such as power conditioning, integrated error checking/recovery, garbage collection, wear leveling, etc. The drives 202 may include an industry standard common storage access interface, often referred to as a host interface. Examples of host interfaces include serial ATA (SATA), small computer system interface (SCSI), non-volatile memory express (NVMe), peripheral component interconnect express (PCIe), Compute Express Link (CXL) etc. The drives 202 may also include an industry standard physical form factor such as M.2, PCIe, 2.5 inch disk drive, etc., or may include off-the-shelf drive components integrated into one or more custom circuit boards (e.g., with more than one drive on each board). In one or more embodiments, the drives 202 may include hard disk drives (HDDs) with magnetic disks as a storage media instead of or in addition to a solid-state storage media (e.g., hybrid drive).

A radiation-hardened array controller 204 is coupled to the array of drives 202. The controller 204 can be hardened by being manufactured with large process nodes, manufacturing on insulating and/or large bandgap substrates, use of bipolar devices, adding shielding, etc. The radiation-hardened drive controller 204 provides failure-resistant data redundancy among the drives 202 of the array. The radiation-hardened drive controller 204 provides access to the array, e.g., to a host computer (not shown). In such a case, the array may be presented as one or more virtual volumes using an arrangement such as redundant array of independent disks (RAID). Note that in one or more embodiments, multiple radiation-hardened array controllers 204 may be coupled to the array of drives 202. In such a case, the controllers 204 may operate in a high-availability arrangement, where each controller 204 acts as a primary controller for a first subset of the drives 202 and is coupled as a secondary controller for a second subset of the drives 202. If a primary controller fails, its function is taken over by the secondary controller, which then controls two subsets of the drives 202.

Figure 3:
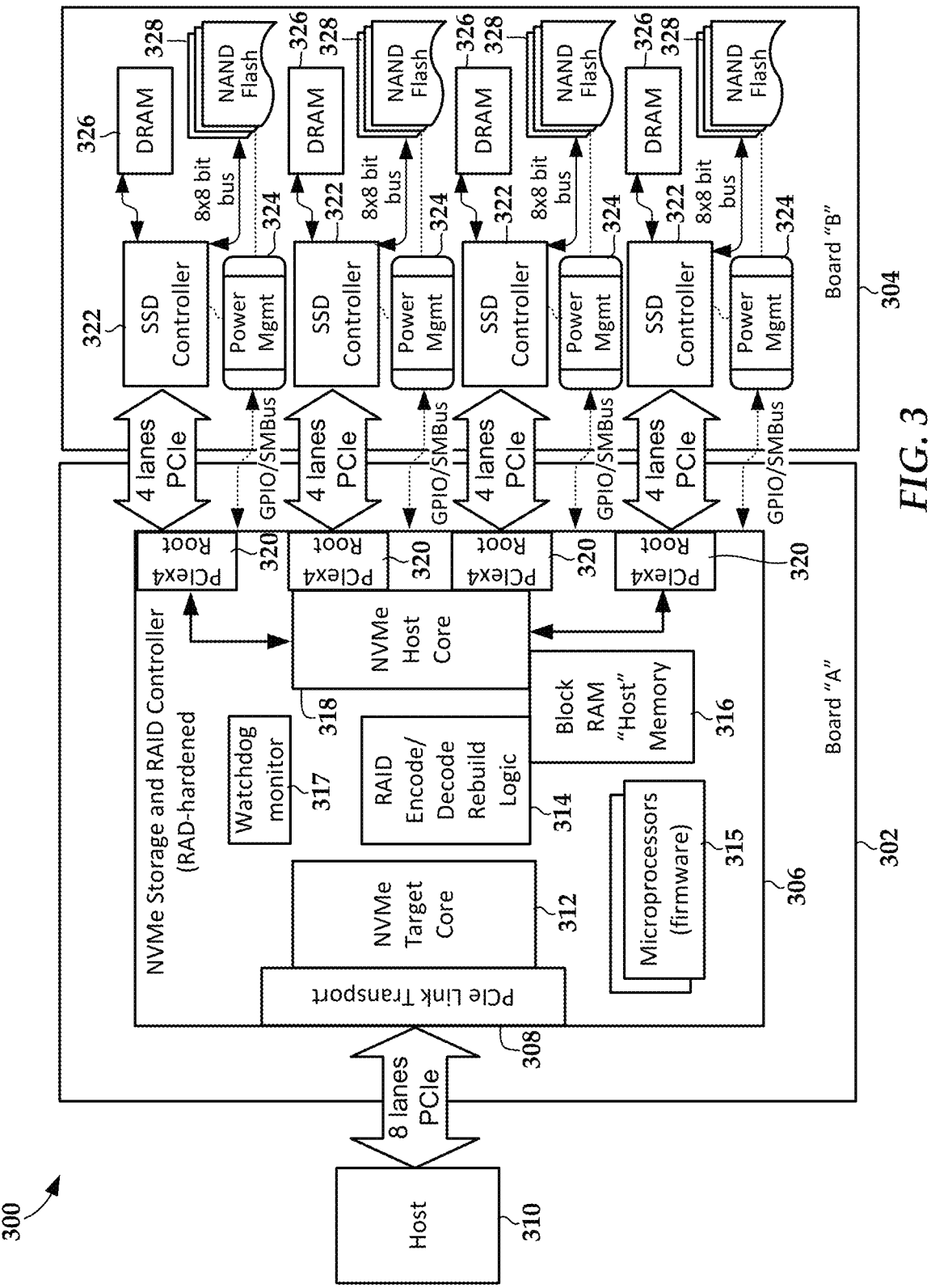
FIGS. 3 and 4 are schematic diagrams of a radiation-hardened storage according to example embodiments.

In FIG. 3, a schematic diagram shows details of a storage system 300 according to an example embodiment. The storage system 300 comprises two boards, controller board 302 and a storage array board 304. The controller board 302 includes a radiation-hardened storage controller 306 with a host interface (here shown as PCIe link transport 308 with 8 PCIe lanes and NVMe target core 312) that facilitates communication with a host 310, e.g., a compute module. The NVMe target core 312 presents the storage controller 306 to the host 310 as a storage device.

In other embodiments, the storage controller 306 can use a different host interface to communicate with the host 310, such as SATA, SAS, or networking interface (e.g., Ethernet, fiber optic networking). In the latter case, the radiation-hardened storage controller 306 could also include an embedded processor and memory for running a file system. The a filesystem controller structures and organizes data and metadata on the storage array board 304 and may be use as a standard filesystem such as new technology file system (NTFS), ext2, ext3, ext4, etc. The radiation-hardened storage controller 306 may also provide a network file system protocol over the networking interface, such as network file system (NFS), server message block (SMB), common Internet file system (CIFS), etc.

The storage controller 306 also includes an NVMe host core 318, which connects to drives on the storage array board 304 as a host device. In this way, the storage controller 306 acts as a proxy for the drives on the storage array board 304, as well as managing the distribution of data and parity among the drives, calculating parity based on data, rebuilding data based on parity, etc. These latter functions are represented by RAID logic block 314, which is located between the NVMe target core 312 and NVMe host core 318. Other functionality of the storage controller 306 (e.g., initialization, scheduling, caching, error handling, security) is managed by firmware which runs in microprocessors 315 and utilizes random access memory (RAM) 316 for storage of instructions and data. A watchdog monitor 317 is also shown in the storage controller board 306 and monitors the system for hangs. The watchdog monitor 317 may also be physically and electrically separate from the storage controller board 306, e.g., may be on the controller board 302 separate from the storage controller 306, or located off of the controller board 302 altogether.

The NVMe host core 318 is coupled to a plurality of PCIe root ports 320. In this example, four root ports 320 are used, each with 3 PCIe lanes. Each of the root ports 320 connects to a corresponding SSD controller 322 on the storage array board 304. The SSD controller 322 may include a commercial, off the shelf (COTS) controller that is configured to operate with respective NAND flash memory modules 328 and dynamic RAM (DRAM) 326. While the flash memory modules 328, SSD controller 322, and DRAM 326 may be COTS devices, the storage array board 304 may include power management modules 324 that are custom designed or selected to be radiation-hardened or resistant. Additional features of the illustrated system 300 as well as other embodiments are described in greater detail below.

Note that while the components in FIG. 3 specifically call out SSDs that utilize NAND flash for data storage, it will be understood that other media, including magnetic disks, may be substituted for NAND flash, in which case the SSDs may be more generally referred to as a drive or storage drive. Also note that the storage array board 304 may include a combination of non-radiation-hardened COTS circuit components and radiation-hardened circuit components, and all of the components may be attached/soldered to a single board. Nonetheless, for the purpose of the present disclosure, a collection of components (e.g., SSD controller 322, DRAM 326, NAND flash 328) coupled to each root port 320 may considered a separate storage drive for purposes of this disclosure. The power management modules 324 may be considered part of the storage drives or separate from the storage drives depending on the implementation.

The inventors have performed failure analysis of NAND components following radiation testing and have devised new solutions for making a commercial SSD product robust enough where, when combined as follows, it is useful in many space-borne applications. Care has been made to harden the areas of the design most critical for reliability, but to do so using less-expensive commercial components where feasible. The storage system may include any combination of elements shown in Table 1 below, which are described in further detail below.

TABLE 1

Radiation resistant/tolerant RAID controller - feasible in rad-hard/rad-tolerant FPGA
Radiation resistant power electronics - feasible in off-the-shelf components
Multiple SSDs in parallel behind the RAID controller
SSD firmware changes for frequent reprogramming of critical flash chip control registers
Independent power control of individual SSDs
Electrical latch-up detection and mitigation
Detection and correction of malfunctioning SSD and RAID controller
Targeted NAND recoveries for environmental conditions
Periodic partial or full reconfiguration of FPGA
A root-of-Trust for device integrity and data confidentiality management

RAID Controller

Testing shows that a single SSD, even without the enhancements discussed later, can run for a while in space normally. By utilizing multiple SSDs in parallel, with RAID redundancy (or other type of failure resistant data redundancy arrangement) and putting them behind a hardened RAID controller 306 that is robust against the space radiation environment, the storage system is no longer dependent upon the failure rate of a single non-hardened device. RAID controllers are small enough to fit in today's RAD-hard/RAD-tolerant FPGAs. By hardening the RAID controller 306, not the SSD controller 322, we minimize the cost of the product but still have acceptable reliability.

Figure 4:
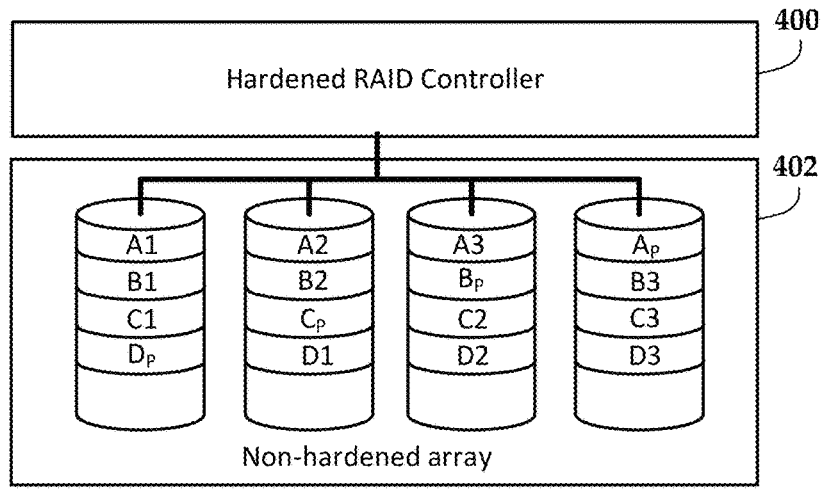

The redundancy level of the RAID controller can be adjusted for the application. For most general-purpose applications, a RAID-5 controller can be used with three data stripes and one parity stripe as shown in FIG. 4. In this diagram, a hardened RAID controller 400 is coupled to a non-hardened (e.g., COTS) drive array 402, which uses four SSDs for example. For a higher-reliability design, different RAID and/or erasure codes can be used allowing for multiple back-end failures before loss of storage functionality. For example, a RAID-6 arrangement with two data stripes and two parity stripes can be used for a four drive array, and additional data stripes can be added if more drives are added to the RAID 6 array.

Radiation Robust Power Electronics

A dependable voltage supply delivered to the components in the storage device (including the SSD controller and solid-state storage media) contributes significantly to the reliability of the system. Many power electronics components (DC-DC regulators) are available that are robust against radiation since they are done in fabrication processes that are naturally more immune to the effects of radiation. Most passives (resistors/capacitors/inductors) are also naturally immune. Some power devices contain memory for settings and are more susceptible to radiation. For prototyping, voltage regulators were used that have been tested and found to be robust against radiation and can be used as power management modules 324 as shown in FIG. 3.

Radiation Testing of NAND Flash

We performed radiation testing of NAND flash at different levels of radiation to understand failure modes in LEO applications. Through failure analysis of these components, we discovered several things in this testing. First, problems were mostly due to corruption of control registers within the NAND. Other failures were related to electrical latch-up of the components.

We believe these problems can be mitigated in the following ways: 1) Frequent reprogramming of NAND control registers; 2) Periodic power-cycling of NAND components to clear any remaining small undetected latch-up events; 3) Detection of latch-up conditions and immediate power-cycling to avoid damage and to clear the condition; 3) Read-after-write; 5) Data integrity codes (Input-Output Error Detection Codes/SCSI Protection Information); 6) Background media consistency checks. These remediations are discussed in the following section, as well as data security measures.

NAND Flash Register Reprogramming

Normally, such as in most commercial SSDs, NAND control registers are set at power-on and rarely reprogrammed. This is the case because doing so requires additional firmware and slightly degrades drive performance. There is little reason to do so in terrestrial applications since these registers are generally reliable. These control registers set operational parameters of the NAND, such as charge pump voltages, multi-level-cell detection thresholds, programming step sizes, etc. These control registers are implemented in flops or RAMs and so are vulnerable to corruption via radiation-induced single-event-upsets (SEUs). For space applications, these registers much more likely to become corrupted due to radiation upset events (SEUs) due to lack of radiation protection from Earth's atmosphere. Fortunately, these SEU disturbs are entirely recoverable by reprogramming the register. In our design, we perform frequent reprogramming (e.g., once per day or more) of NAND control registers, which is very feasible with modified controller firmware with a small, but manageable impact to drive performance.

Latch-Up

Latch-up is a well-known issue with silicon electronics. It is essentially a type of short circuit within a conventional semiconductor device that can occur during voltage transients, excessive heat, and from radiation. Latch-ups can vary in scope and severity and their effects can grow. Broad latch-ups can lead to overheating and device failure. Smaller latch-ups may occur within a local region of an integrated circuit. We can monitor for latch-up by measuring the current draw of components, such as NAND 328 and the SSD controller 322, e.g., via the power management modules 324 which communicate this to the storage controller board 306 via general purpose input-output (GPIO) lines and/or system management bus (SMBus). This may also or instead be detected by a component on the controller board, as indicated by latch-up detector 319.

The current draw of these components will change rapidly on a severe latch-up, and can be caught quickly, however a small latch-up may be hard to distinguish from the normal variation in current draw due to host operation variability. In some examples, the latch-up detector is a system such as a machine-learning algorithm or Kalman filter that factors the drive's/NAND's current workload and temperature into consideration in its detection mechanism to avoid false triggers, yet to not miss smaller triggers. One example would be to have individual current monitors on every NAND component and the controller. In the example design, the current monitoring is more granular, such as over an entire SSD, which may still an improvement over no monitoring at all.

When a latch-up is detected, the recovery is straight-forward: remove power long enough for the latched-up component to cool, typically for a few seconds. During this time, any operations can be deferred or cached until the SSD recovers and is ready for rebuild (if necessary) and normal operation. This removal and re-application of power may be repeatedly performed at regular intervals even if no latch up is detected, e.g., every N hours, where N>1. This can be repeatedly performed at irregular intervals as well, e.g., based on cumulative environmental conditions (e.g., temperature, radiation) and may be limited by a floor function and/or ceiling function to ensure minimum and maximum times between restarts.

Malfunction Detection Via Watchdog

Another line of defense is an interwoven watchdog system. The system works by having critical portions of the design (such as the operating system of SSD and RAID controllers) periodically change the value of "heartbeat" signals sent to other components in the system, such as dedicated hardware (e.g., watchdog monitor 317) within the radiation-hardened storage controller 306. This hardware monitors for the periodic changing values and uses the absence of a change of values to detect that a hang has occurred within a component. Such a watchdog monitor 317 can be an independently running logic circuit (e.g., powered and clocked independently of the microprocessor). If only the storage drives are monitored for hangs, the watchdog monitor 317 may be implemented in the firmware operated by the microprocessor 315 of the storage controller 306.

Periodic Read-After-Writes/Background Media Scan

Periodic read-after-writes is a technique that occasionally reads back recently written data and compares it (or a hash/parity/checksum of the data) against a reference to ensure that data is reliably being written by the downstream device. Background media scan is a process that reads all sectors of a device to ensure they are readable. With a RAID system, if a read operation fails (e.g., cannot recover the page, can read the page but the comparison with the reference returns an error), we can rebuild the data and restore it. This can also be used to detect a failing device.

Targeted NAND Recoveries for Environmental Conditions

Space is a unique environment with unique conditions such as faster periodic temperature fluctuations across a wider range of temperatures than terrestrial applications, −30° C. to 80° C. for space vs. 0° C. to 70° C. for terrestrial. With characterization data from this environment, we will be able to devise unique voltage threshold (VT) shift recoveries targeting this environment. The recovery characteristics can be programmed into the NAND control registers of the NAND flash memory 328.

Periodic Partial or Full Reconfiguration of FPGA

The storage controller 306 can be implemented in a RAD-tolerant/RAD-hardened FPGA. An FPGA configuration memory is typically SRAM based memory and there is risk of a single even upset (SEU) in the configuration memory caused by high energy charged particles. If FPGA configuration memory is affected by SEUs this can affect the intended behavior or may lead to single event functional interrupt. To mitigate issues due to SEUs we are proposing two methods: 1) Periodic partial reconfiguration (reprogramming) of critical functions within FPGA (e.g., operating system, heartbeat monitors, host interface functionality); and 2) Periodic full reconfiguration of entire FPGA (affecting all of the functions/gates of the FPGA)

Both partial or full reconfiguration can be initiated by internal or external smart-watchdog function. This periodic reconfiguration will mitigate risks of malfunction due to configuration memory changes because of SEUs.

Data Integrity Codes

While many commercial drives rely on the host to detect data errors introduced outside of the storage media, some systems also check internally transferred data, e.g., between internal buffers and queues, as well as data transferred between the drives and host, e.g., via storage controllers. Examples of data protection schemes include Input-Output Error Detection Codes (IOEDC) and SCSI Protection Information (PI). These are currently implemented in mission-critical enterprise storage, and therefore are straightforward to include in a radiation-hardened storage system for additional data integrity assurances.

Root-of-Trust for Device Integrity & Data Confidentiality

An integrated and isolated security domain will provide Root-of-Trust capabilities and support security services for the storage solution. These services include platform boot code integrity, secure code update and recovery using AB copies, a cryptographic device identity, attestation of platform identity and firmware, and limited cryptographic services. Additionally, the security subsystem will manage data confidentially by providing key management services and an interface for access control of data stored on media. Data confidentiality partitions (or encrypted data ranges) are exposed to the host and mapped by the RAID controller to the backend devices' encrypted data ranges.

Multilevel Security (MLS) Access-Controls

The security subsystem will provide a secure interface to the host system for the setup of policies that enforce a Bell-LaPadula based data access control mechanism. The storage controller 306 will enable additional logic that provides "write up/read down" capabilities once an MLS policy is set. The backend of the storage device is partitioned to separate data by its classification label. Based on the host process classification labels provided either through the file system partition or network link, MLS data access is enforced by the RAID controller. The logic's integrity is assured through the secure boot capabilities of the controller and can be validated by the host via attestation requests.

Figure 5:
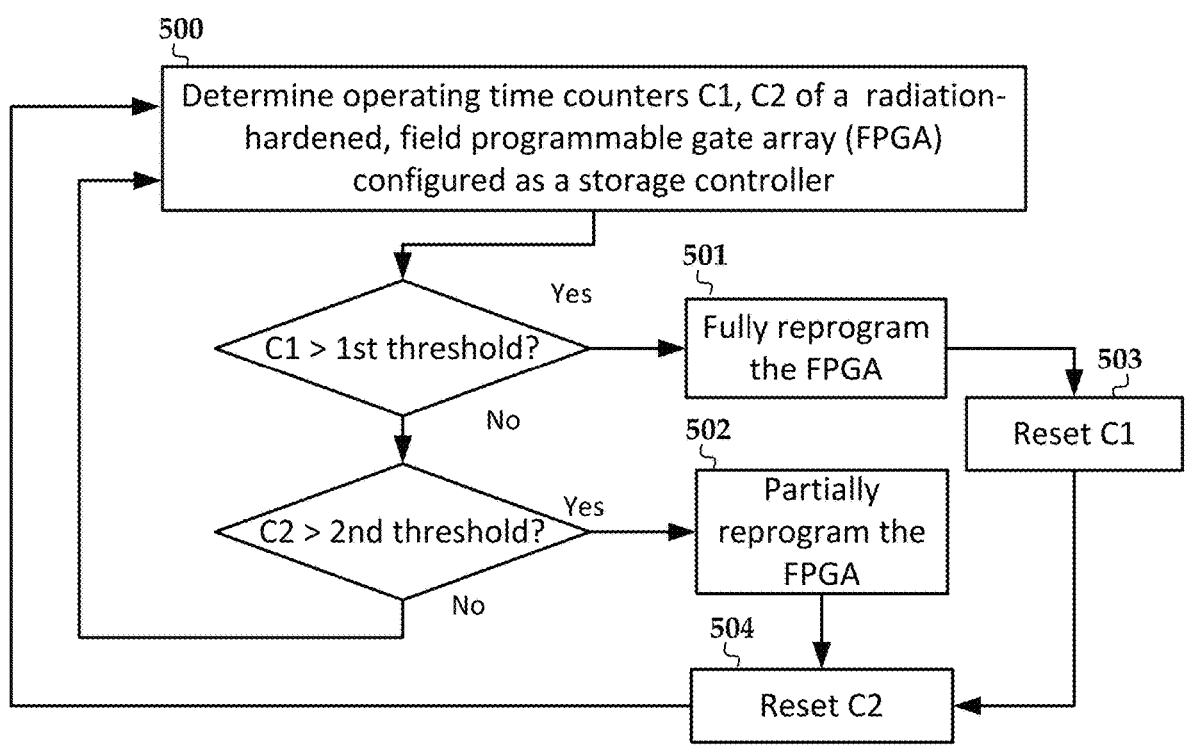
FIGS. 5 and 6 are flowcharts of methods according to example embodiments.

In FIG. 5, a flowchart illustrates a method according to an example embodiment. The method involves determining 500 an operating time counter of a radiation-hardened, FPGA configured as a storage controller. In this example, two counters C1 and C2 are used for full and partial reprogramming, where C1>C2. Based on the operating time counter C1 passing a first threshold, the method involves fully reprogramming 501 the FPGA. Based on the operating time counter C2 passing a second threshold, the method involves partially reprograming 502 the FPGA. Note that one of the reprogramming 501, 502 steps and associated counters may be optional. One or both of the operating time counters are reset 503, 504, and the method repeats.

Figure 6:
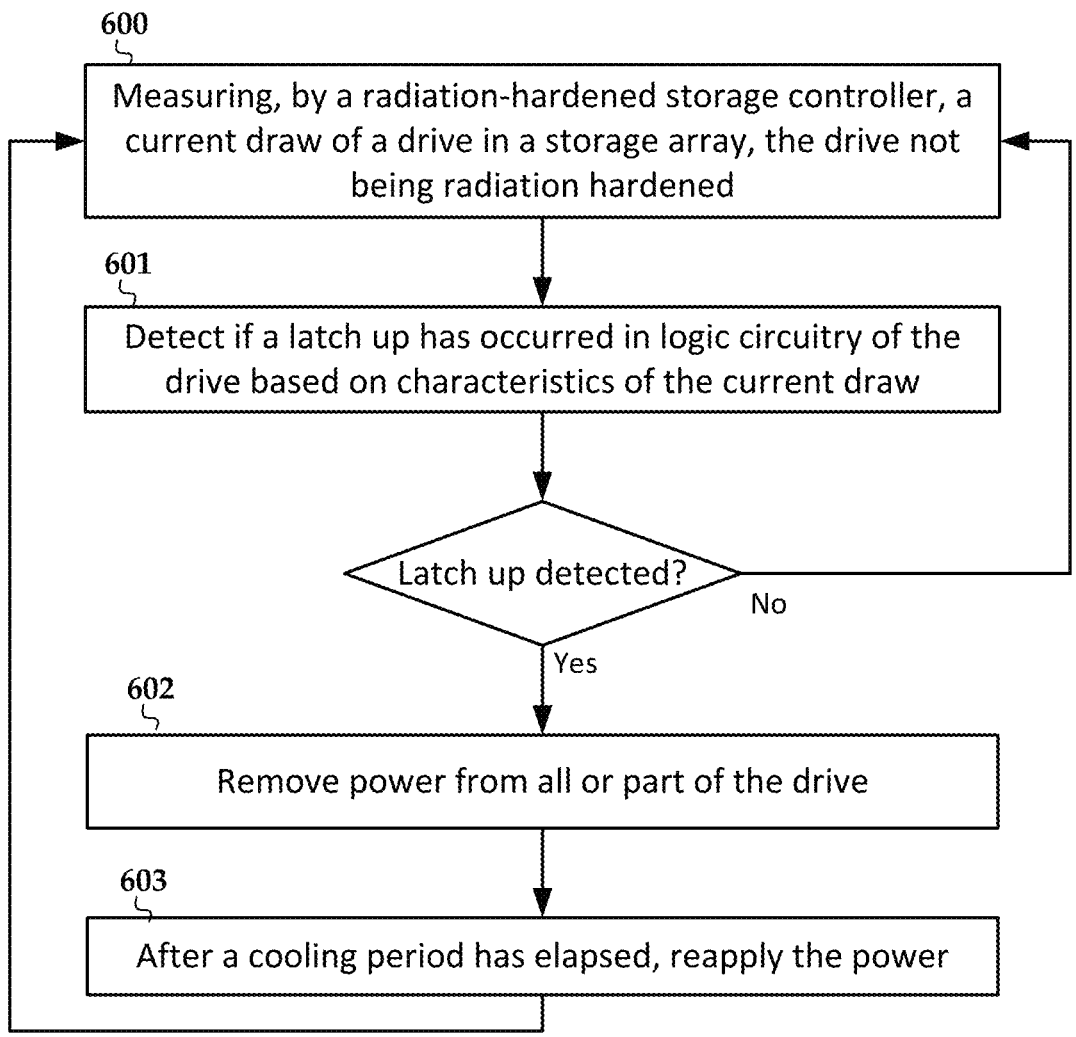

In FIG. 6, a flowchart illustrates a method according to another example embodiment. The method involves measuring 600, by a radiation-hardened storage controller, a current draw of a drive in a storage array, the drive not being radiation-hardened. The measurement may be a single measurement of all drive components or a separate measurement, e.g., drive controller current draw, storage media current draw, RAM current draw, etc. Based on characteristics of the current draw (e.g., a current surge that does not correlate to current use conditions), a latch up is detected 601 that has occurred in logic circuitry of the drive based on the current draw. Based on the detected latch up, power is removed 602 from all or part of the drive, e.g., corresponding to a granularity of the measurement 600. After a cooling period has elapsed, the power is reapplied 603. This process may also repeat in an infinite loop.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 3, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A data storage system for use in a high radiation environment, comprising:
   an array of storage drives each comprising a non-radiation-hardened drive controller, a non-radiation-hardened, non-volatile, storage medium, and a non-radiation-hardened volatile memory; and
   a radiation-hardened storage controller coupled to the array, the radiation-hardened storage controller providing failure-resistant data redundancy among the storage drives of the array, the radiation-hardened drive controller providing host access to the array.

2. The data storage system of claim 1, wherein the failure-resistant data redundancy comprises a redundant array of independent disk (RAID) arrangement of the array.

3. The data storage system of claim 1, wherein the storage controller is implemented in a radiation-hardened, field programmable gate array (FPGA).

4. The data storage system of claim 3, wherein the system is configured to perform one or both of: periodic partial reconfiguration of critical functions within the FPGA; and periodic full reconfiguration of all of the functions within the FPGA.

5. The data storage system of claim 1, further comprising one or more radiation-robust power controllers coupled to the drive controllers and the non-volatile, storage media.

6. The data storage system of claim 1, wherein the non-volatile storage medium comprises a solid state storage media.

7. The data storage system of claim 6, wherein the solid state storage media comprises NAND flash memory.

8. The data storage system of claim 6, wherein control registers that set operational parameters of the solid state storage media are reprogrammed regularly.

9. The data storage system of claim 1, further comprising one or more current monitors on each of the storage drives, the one or more current monitors detecting a latch up condition affecting one or both of the drive controllers and the non-volatile, storage media.

10. The data storage system of claim 9, wherein the one or more current monitors utilize a machine-learning algorithm or Kalman filter that factors a current workload and temperature of the storage drives when detecting the latch up condition.

11. The data storage system of claim 9, wherein upon detecting the latch up condition, the storage controller removes power from one or both of the drive controllers and the non-volatile, storage media, the power being reapplied after a cooling period.

12. The data storage system of claim 1, wherein the storage controller repeatedly removes power from one or both of the drive controllers and the non-volatile, storage media to mediate latch up conditions, the power being reapplied after a cooling period.

13. The data storage system of claim 1, wherein the drive controllers and the storage controller send a heartbeat signal to a dedicated watchdog monitor hardware device to detect a component hang.

14. The data storage system of claim 1, wherein the system is configured to periodically read back data stored on the non-volatile, storage media, compare the data to a reference, wherein if the read back of the data fails, the data is rebuilt and restored.

15. The data storage system of claim 1, wherein the storage controller comprises an integrated and isolated security domain that provides root-of-trust capabilities and supports security services for the system.

16. The data storage system of claim 1, wherein the storage controller further comprises a security subsystem that provides a secure interface to a host system for setup of policies that enforce a Bell-LaPadula-based data access control mechanism.

17. A data storage system for use in a high radiation environment, comprising:
    a controller board comprising a radiation-hardened storage controller; and
    a storage array board coupled to the controller board, the storage array board comprising an array of storage drives, each of the storage drives comprising:
    a non-radiation-hardened drive controller;
    a non-radiation-hardened, NAND flash medium coupled to the controller; and
    a non-radiation-hardened volatile memory coupled to the controller;
    wherein the radiation-hardened storage controller provides failure-resistant data redundancy among the storage drives of the array, the radiation-hardened drive controller providing host access to the array.

18. The data storage system of claim 17, wherein the radiation-hardened storage controller is implemented in a radiation-hardened, field programmable gate array (FPGA), and wherein the system is configured to perform one or both of: periodic partial reconfiguration of critical functions within the FPGA; and periodic full reconfiguration of all of the functions within the FPGA.

19. The data storage system of claim 17, wherein control registers that set operational parameters of the NAND flash media are reprogrammed regularly.

20. The data storage system of claim 17, further comprising one or more current monitors dedicated to each of the storage drives, the one or more current monitors detecting a latch up condition affecting one or both of the drive controller and the NAND flash medium of the dedicated storage drive, and wherein upon detecting the latch up condition, the radiation-hardened storage controller removes power from one or both of the drive controller and the NAND flash medium of the dedicated storage drive, the power being reapplied after a cooling period.

21. The data storage system of claim 17, further comprising a dedicated watchdog monitor hardware device that receives heartbeat signals from the storage controller and the drive controllers of the array to detect a component hang.

\* \* \* \* \*